United States Patent [19]

Toth, Jr. et al.

[11] 3,971,218

[45] July 27, 1976

[54] MEANS FOR PREVENTING AN ENGINE TURBOCHARGER FROM BEING DAMAGED BY FOREIGN OBJECTS

[75] Inventors: Michael Toth, Jr., Crosby; Jean Andre Jackson, Jr., Houston, both of Tex.

[73] Assignee: DeLaval Turbine Inc., Princeton, N.J.

[22] Filed: Dec. 26, 1974

[21] Appl. No.: 536,625

[52] U.S. Cl. .............................. 60/597; 60/39.09 P; 60/602; 415/121 G
[51] Int. Cl.² ........................................ F02G 3/00
[58] Field of Search ............................ 415/9, 121 G; 60/39.09 P, 602, 597, 598, 39.09 R; 55/274, 306, 397, 399, 456, 457

[56] References Cited
UNITED STATES PATENTS

| | | | |
|---|---|---|---|
| 2,560,210 | 7/1951 | Browne................................. | 60/602 |
| 2,879,936 | 3/1959 | Faught................................... | 415/9 |
| 3,329,377 | 7/1967 | Peterson et al. ...................... | 55/306 |
| 3,362,155 | 1/1968 | Driscoll................................. | 55/457 |
| 3,389,553 | 6/1968 | Hardy et al. .......................... | 60/602 |
| 3,521,431 | 7/1970 | Connors et al. ...................... | 55/306 |
| 3,733,814 | 5/1973 | Hull, Jr. et al................... | 415/121 G |
| 3,766,719 | 10/1973 | McAnally ....................... | 415/121 G |

*Primary Examiner*—Wendell E. Burns
*Assistant Examiner*—David D. Reynolds
*Attorney, Agent, or Firm*—Hopgood, Calimafde, Kalil, Blaustein & Lieberman

[57] ABSTRACT

The invention contemplates a protective measure for internal parts of a gas turbine, whereby foreign objects in the flow of inlet gas to the turbine are subjected to strong centrifugal action at a locally frangible region of the inlet duct, i.e., prior to turbine exposure. The material and structure of the frangible region are selected such that foreign objects of greater than predetermined mass will rupture the same and thus avoid ingestion of such objects in the gas turbine. The invention is described for the case of a turbocharger which is operated by exhaust gas from an internal-combustion engine, and which supplies compressed inlet air to the engine; upon rupture of the frangible region, a rotor-bypassing flow is established to the gas-turbine exhaust for safe handling of engine exhaust and for use in prompt development of a suitable warning.

13 Claims, 3 Drawing Figures

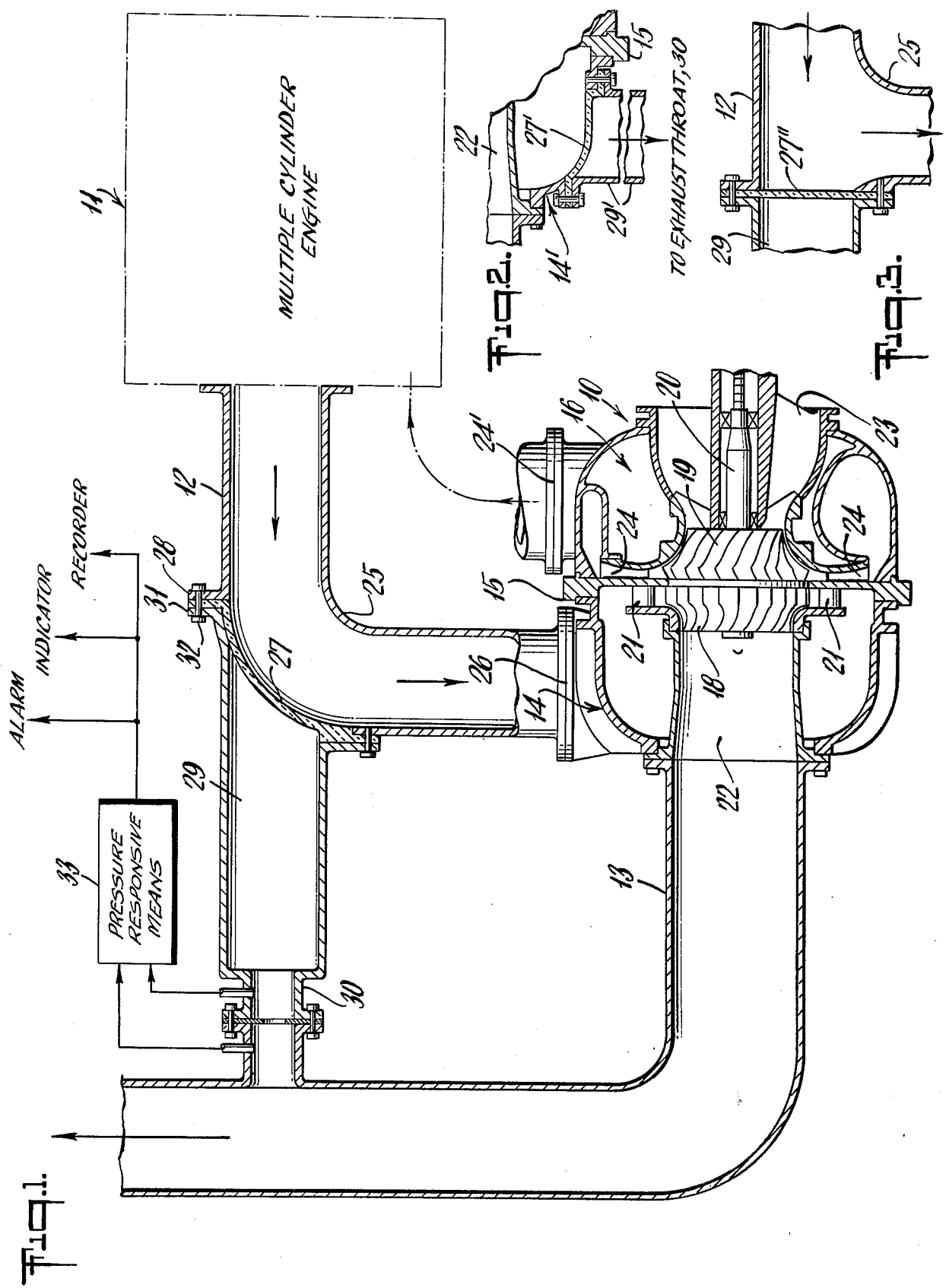

MEANS FOR PREVENTING AN ENGINE TURBOCHARGER FROM BEING DAMAGED BY FOREIGN OBJECTS

The invention relates to gas turbines and in particular to the gas-turbine segment of a turbocharger for an internal-combustion engine.

It is an object to provide improved means of insuring safe operation of a gas turbine of the character indicated, without impairment of gas flow to the turbine during normal operation.

It is a specific object to provide frangible structure at a region of centrifugal-force development upstream from the supply of driving gas to the turbine, the frangible structure being selected to rupture under impact by a foreign particle in the gas flow and having at least a predetermined minimum mass.

Another specific object is to safely accommodate gas escaping from turbine-inlet flow by reason of such rupture.

A further specific object is to provide a warning of the occurrence of such a rupture so that prompt corrective measures may be taken.

A still further object is to achieve the above objects without resort to strainer or flow-separating devices, which characterize the prior art.

Other objects and various further features of novelty and invention will be pointed out or will occur to those skilled in the art from a reading of the following specification in conjunction with the accompanying drawing, in which:

FIG. 1 schematically shows an arrangement of components to construct one form of the invention; and FIGS. 2 and 3 are fragmentary views to illustrate modifications of parts of FIG. 1.

In the drawing, the invention is shown in application to the turbocharger 10 for an internal-combustion engine 11. The engine 11 includes an exhaust manifold 12 serving a plurality of cylinders and constituting an elongate straight part of the inlet-gas duct to the gas-turbine section of turbocharger 10. Exhaust from the gas-turbine section is served by duct means 13 to a stack (not shown). The gas-turbine section is contained within a first housing structure 14 mounted to a rigid central partition 15, and a second housing structure 16 for the compressor section is also mounted to partition 15. A turbine rotor 18 and compressor wheel 19 are carried back-to-back on a shaft 20 supported by spaced bearings in the compressor section 16. Exhaust gas from engine 11 enters the gas-turbine section via the inlet duct to nozzle vanes 21 providing circumferentially distributed division of radially inward flow to rotor 18, exhaust therefrom being axially conducted by a cone section 22 to the stack duct 13. In the compressor section, air is drawn via an axial inlet passage 23 to wheel 19 and is radially outwardly impelled thereby through diffuser means 23 to a tangential outlet connection 24' to engine 11.

In accordance with the invention, the gas-inlet duct serving the gas-turbine section is configurated to impart significant centrifugal force to foreign particles or objects of such size and mass as to be injurious to turbine operation, and the duct wall is locally frangible in the region of such force development, all to the end that the frangible wall portion will be ruptured by impact of such a particle or object. In the form shown, the centrifugal force is developed by a substantial directional change in the axis of the gas-inlet duct, the same being produced by an elbow formation 25 between the elongate manifold portion 12 and the gas-inlet connection 26 to the turbine housing section 14. Preferably, the directional change imparted by formation 25 is at least substantially 90°. At the outer wall of the bend formation 25, a local window (e.g., a generally elliptical cut-out, in elbow 25) is closed by a frangible wall or plate element 27 which is preferably so tailored to the inner-wall contour of the gas-inlet duct as to normally provide a smoothly faired and continuous part thereof. The frangible element 27 is shown integrally provided with mounting-flange formations, accurately fitted to corresponding flange formations as at 28, on the gas-inlet duct. A collecting device, such as an elongate chamber or housing 29 is in general alignment with manifold 12, being closed at one end by the frangible plate 27 and having a flow connection 30 at its other end to the exhaust duct 13 to the stack; flange formations 31 on chamber 29 are closely adapted to the flange formations of plate 27, enabling use of bolts 32 to removably secure all flanges.

In operation, and under normal conditions, there will be no foreign objects or particles of harmful size or mass in the exhaust-gas flow from engine 11. This being the case, a smooth and continuous inlet-gas duct will serve the turbine section, for utmost efficiency of turbocharger operation. In a typical installation serving a 2000 horsepower diesel engine 11, a turbocharger 10 will utilize an exhaust-gas flow of 5500 SCFM at 12 to develop a 3:1 pressure rise in a similar flow of air into the compressor section; the manifold or duct 12 may in such case be of say 10 inches internal diameter, carrying a gas flow at about 600 feet per second to the turbine rotor 18. A foreign object, such as corrosion-severed internal part of the engine-exhaust system will be rapidly accelerated in the elongate manifold section 12 before subjection to strong centrifugal action at bend 25. If such object is massive enough to harm the gas-turbine section of turbocharger 10, its impact on plate 27 will be sufficient to produce rupture, all broken parts and the foreign object being then discharged into the collection chamber 29. At the same time, a new flow of engine-exhaust will be established via connection 30 to the stack, in shunt across rotor 18 and vanes 21. Preferably, the restriction at 30 is such as to establish such bypass flow at approximately 10 percent of engine exhaust flow, and means 33 responsive to onset or existence of such flow may be used to provide audible, visible or recorded indication of the fact, as suggested by legend in the drawing. As shown, the flow response is detected by monitoring pressure differential across a restrictive orifice in the connection 30.

It will be seen that the described invention meets all stated objects and that it is applicable to a variety of engine types and sizes and of gas-turbine configurations. The internal sectional area of the collector chamber 29 is preferably at least as great as the bore section of manifold 12, and it is relatively elongate (as shown), so that in the event that the foreign object which causes rupture is but the first of a succession of broken parts, then all such parts will automatically be caught at chamber 29. It will also be appreciated that the quarterbend shown at 25 is only illustrative of a variety of duct shapes to produce rupture by a foreign object, the optimum shape being a matter for development to accommodate the requirements of any given installation. Generally speaking, the frangible element 27 should be of material selected for low impact resistance but of sufficient strength for continued service. Thus, plate 27 may be stamped from suitable alloy material, but a ceramic material such as silicon nitride is presently preferred.

While the invention has been shown and described for a preferred form, it will be understood that modifications may be made without departure from the scope of the invention. For example, the showing of frangible element 27 and collection chamber 29 at a location preceding entrance into the turbine case 14 will be understood to be purely illustrative of the provision of the inventive feature at a location of changed flow direction; thus, for a radial-inflow turbine, as at 14-21-18, such a changed flow direction necessarily occurs in the turbine case 14, and therefore the frangible element (and the collection chamber served thereby) may be provided at a cut-out region of the turbine case 14, as suggested at 27'-29' at lower location 14' in the fragmentary drawing of FIG. 2.

Still further, by way of example, in view of the fact that some applications may allow flow disturbance in the inlet flow to the turbine section 14, then all possibility of ricochet of foreign material by a curved surface (such as any part of the elbow 25) can be avoided by forming the frangible element 27 as a flat plate, normal to the flow exhausted by manifold 12, as at a location and orientation suggested at 27'' in FIG. 3; such location and orientation at 27' may be described as further down in the collection chamber 29 and normal to the exhaust flow from engine 11.

What is claimed is:

1. In combination, a gas turbine comprising a housing and a turbine rotor supported for rotation therein, an inlet duct connected to said housing and including means for connecting the inlet end thereof to the exhaust-gas outlet of an engine for supplying a flow of engine-exhaust gas to drive said rotor, said inlet duct including a substantial bend for changing the direction of inlet gas flow prior to driving impingement upon said rotor, whereby particles in said gas flow are subjected to a degree of centrifugal action by reason of such change of flow direction, said duct including a frangible-wall element in the region of such centrifugal action, and a collection device connected to said duct behind said frangible wall element.

2. The combination of claim 1, and an exhaust duct connected to said housing for exhaust of gas issuing from said turbine, said collection device comprising a chamber in part closed by said frangible-wall element and having a flow-discharge connection to said exhaust duct, whereby in the event of rupture of said frangible-wall element a gas flow will be established in shunt across said rotor.

3. The combination of claim 2, in which said flow-discharge connection includes a constrictive element limiting the by-pass flow to a relatively small fraction of the inlet flow to said rotor.

4. In combination, a gas turbine comprising a housing and a turbine rotor supported for rotation therein, an inlet duct connected to said housing for supplying a flow of inlet gas to drive said rotor, said inlet duct including a substantial bend for changing the direction of inlet gas flow prior to driving impingement upon said rotor, whereby particles in said gas flow are subjected to a degree of centrifugal action by reason of such change of flow direction, said duct including a ceramic frangible-wall element in the region of such centrifugal action, and a collection device connected to said duct behind said frangible wall element.

5. In combination, a gas turbine comprising a housing and a turbine rotor supported for rotation therein, an inlet duct connected to said housing for supplying a flow of inlet gas to drive said rotor, said inlet duct including a substantial bend for changing the direction of inlet gas flow prior to driving impingement upon said rotor, whereby particles in said gas flow are subjected to a degree of centrifugal action by reason of such change of flow direction, said duct including a frangible-wall element in the region of such centrifugal action, a collection device connected to said duct behind said frangible wall element, an exhaust duct connected to said housing for exhaust of gas issuing from said turbine, said collection device comprising a chamber in part closed by said frangible-wall element and having a flow-discharge connection to said exhaust duct, and flow-sensitive indicating means in said flow-discharge connection, whereby in the event of rupture of said frangible-wall element a gas flow will be established in shunt across said rotor and the occurrence of rupture will be promptly apparent.

6. The combination of claim 4, in which said ceramic is silicon nitride.

7. The combination of claim 1, and including an internal-combustion engine having an exhaust connection to said inlet duct for rotor operation by engine-exhaust gases, and air-compressor means driven by said rotor for compression of inlet air supplied to said engine.

8. The combination of claim 1, in which said bend is in the order of at least substantially a 90° change in flow direction.

9. In combination, an internal-combustion engine having an exhaust outlet, a gas turbine comprising a housing and a turbine rotor supported for rotation therein, an inlet duct connecting said exhaust outlet to said housing for supplying a flow of inlet gas to drive said rotor, said inlet duct including a substantial bend for changing the direction of inlet gas flow prior to driving impingement upon said rotor, whereby particles in said gas flow are subjected to a degree of centrifugal action by reason of such change of flow direction, said duct including a frangible-wall element in the region of such centrifugal action, and a collection device connected to said duct behind said frangible wall element.

10. The combination of claim 9, in which said inlet duct includes an exhaust-connection portion which is relatively straight and elongate immediately prior to onset of said bend.

11. The combination of claim 10, in which said collection device is elongate in the general direction of said elongate inlet-duct portion.

12. The combination of claim 1, in which said turbine is of the radial-inflow variety, whereby said housing effectively forms a part of said inlet duct at which part a substantial change in flow occurs prior to driving impingement upon said rotor, said frangible-wall element being local to said housing part.

13. The combination of claim 1, in which said frangible-wall element is oriented substantially normal to a region of inlet-gas flow in said duct.

* * * * *